(12) United States Patent
Vlahogeorge

(10) Patent No.: US 9,434,631 B2
(45) Date of Patent: *Sep. 6, 2016

(54) APPARATUS FOR REMOVING MATERIAL FROM A BODY OF LIQUID

(71) Applicant: John T. Vlahogeorge, West Lafayette, IN (US)

(72) Inventor: John T. Vlahogeorge, West Lafayette, IN (US)

(73) Assignee: John T. Vlahogeorge, West Lafayette, IN (US)

( * ) Notice: Subject to any disclaimer, the term of this patent is extended or adjusted under 35 U.S.C. 154(b) by 208 days.

This patent is subject to a terminal disclaimer.

(21) Appl. No.: 14/454,077

(22) Filed: Aug. 7, 2014

(65) Prior Publication Data

US 2016/0039699 A1 Feb. 11, 2016

(51) Int. Cl.
*B01D 21/24* (2006.01)
*C02F 11/00* (2006.01)
*C02F 103/20* (2006.01)

(52) U.S. Cl.
CPC ........... *C02F 11/00* (2013.01); *B01D 21/2472* (2013.01); *C02F 2103/20* (2013.01)

(58) Field of Classification Search
CPC ............ B01D 21/245; B01D 21/2466; B01D 21/2472
USPC ............................... 210/523, 524, 532.1, 803
See application file for complete search history.

(56) References Cited

U.S. PATENT DOCUMENTS

| | | | |
|---|---|---|---|
| 1,694,668 A * | 12/1928 | Peters | B08B 9/0933 210/533 |
| 1,703,041 A | 2/1929 | Imhoff | |
| 2,732,944 A * | 1/1956 | Hays | B01D 21/2466 210/534 |
| 3,013,395 A * | 12/1961 | Gaylord | B01D 21/2472 210/532.1 |
| 4,181,614 A | 1/1980 | Steenhorst | |
| 4,376,048 A | 3/1983 | Kovacs | |
| 4,600,338 A | 7/1986 | Van Bruwaene et al. | |
| 4,863,594 A | 9/1989 | Pedretti | |
| 4,913,819 A * | 4/1990 | Patterson | B01D 21/2466 210/523 |
| 5,161,914 A | 11/1992 | Rahn et al. | |
| 5,176,838 A * | 1/1993 | Chin | B01D 21/2472 210/525 |
| 5,435,924 A * | 7/1995 | Albertson | B01D 21/245 210/525 |
| 5,772,885 A | 6/1998 | Sarrouh | |
| 6,234,323 B1 | 5/2001 | Sarrouh | |
| 6,878,295 B2 | 4/2005 | Hubenthal et al. | |
| 6,953,528 B2 * | 10/2005 | Nesfield | E02B 3/023 210/532.1 |
| 7,105,096 B2 | 9/2006 | Meurer | |
| 7,284,670 B2 | 10/2007 | Schmid | |
| 7,459,076 B2 | 12/2008 | Cote et al. | |
| 7,462,290 B2 * | 12/2008 | Hauge | B01D 21/2472 210/523 |
| 8,372,274 B2 | 2/2013 | Early et al. | |
| 8,440,073 B2 | 5/2013 | Chen | |
| 2006/0006126 A1 * | 1/2006 | Hadfield | B01D 21/2472 210/803 |

FOREIGN PATENT DOCUMENTS

DE          43 25 010       *    2/1995

* cited by examiner

Primary Examiner — Christopher Upton
(74) Attorney, Agent, or Firm — Wood, Emhardt, Moriarty, McNett & Henry LLP

(57) ABSTRACT

An apparatus for removing sludge from a reservoir of liquid. A downwardly opening enclosure is positioned atop the floor of a reservoir with the enclosure having inlets for sludge and liquid to flow into the cavity of the enclosure. Gas emitters on the opposite edge portions of the enclosure assist the flow of sludge and liquid into the cavity which is slanted upwardly towards an outlet having a lift pump for pulling the sludge and liquid from the enclosure. An optional additional passage leading from the cavity to a holder beneath the enclosure receives heavy sludge falling there through.

13 Claims, 4 Drawing Sheets

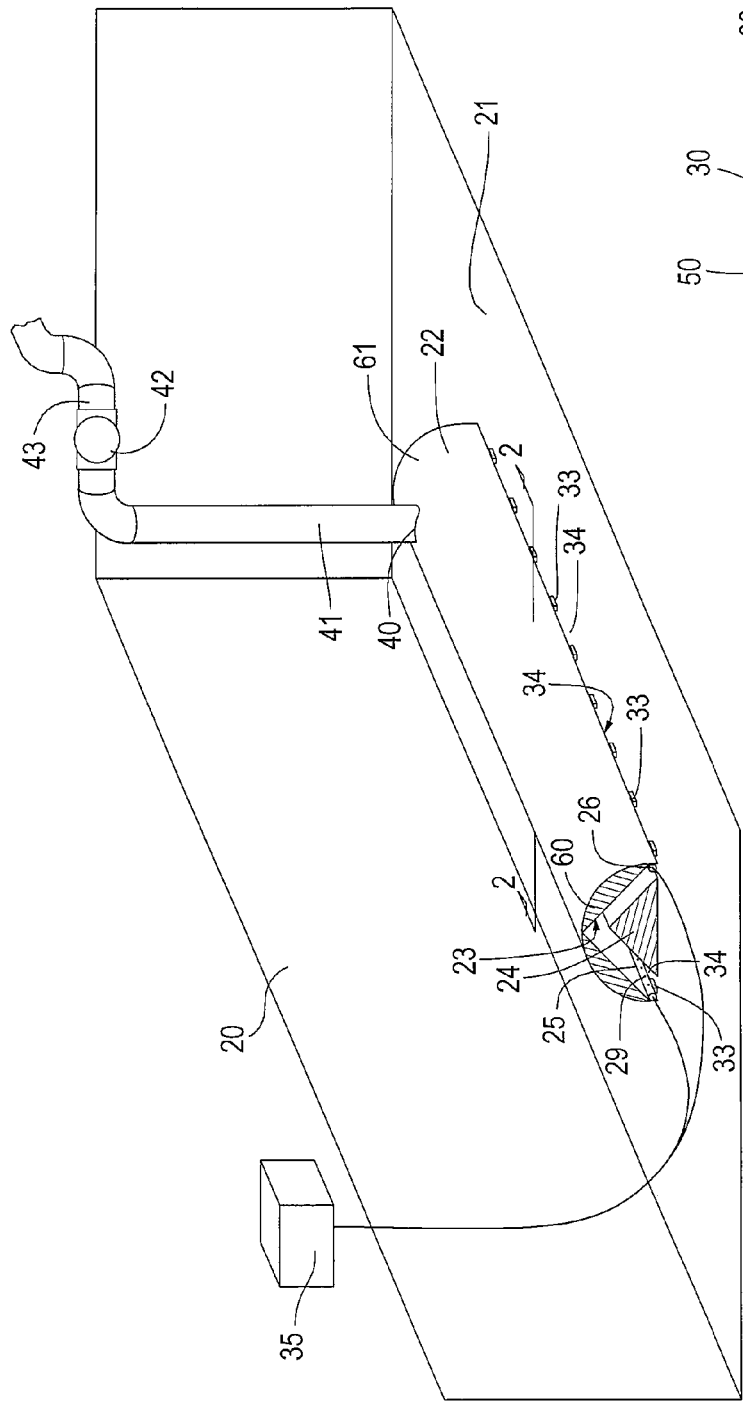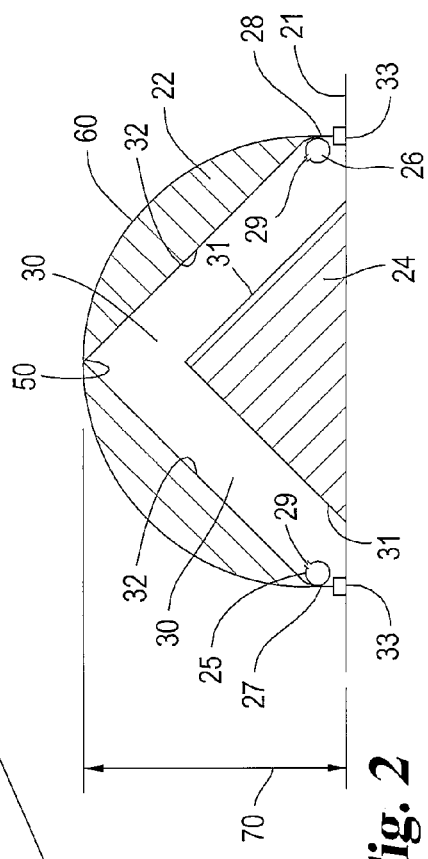
Fig. 1
Fig. 2

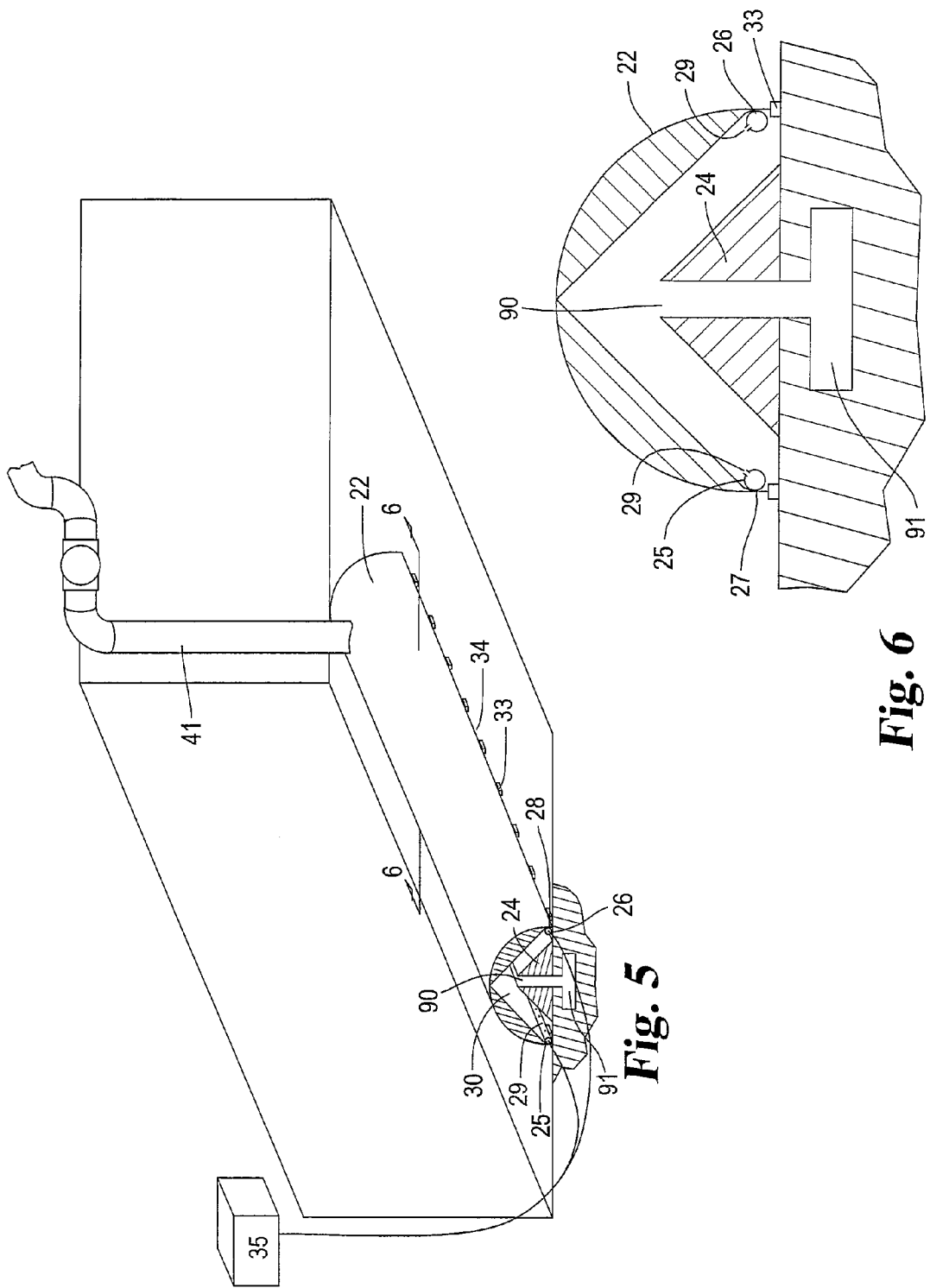

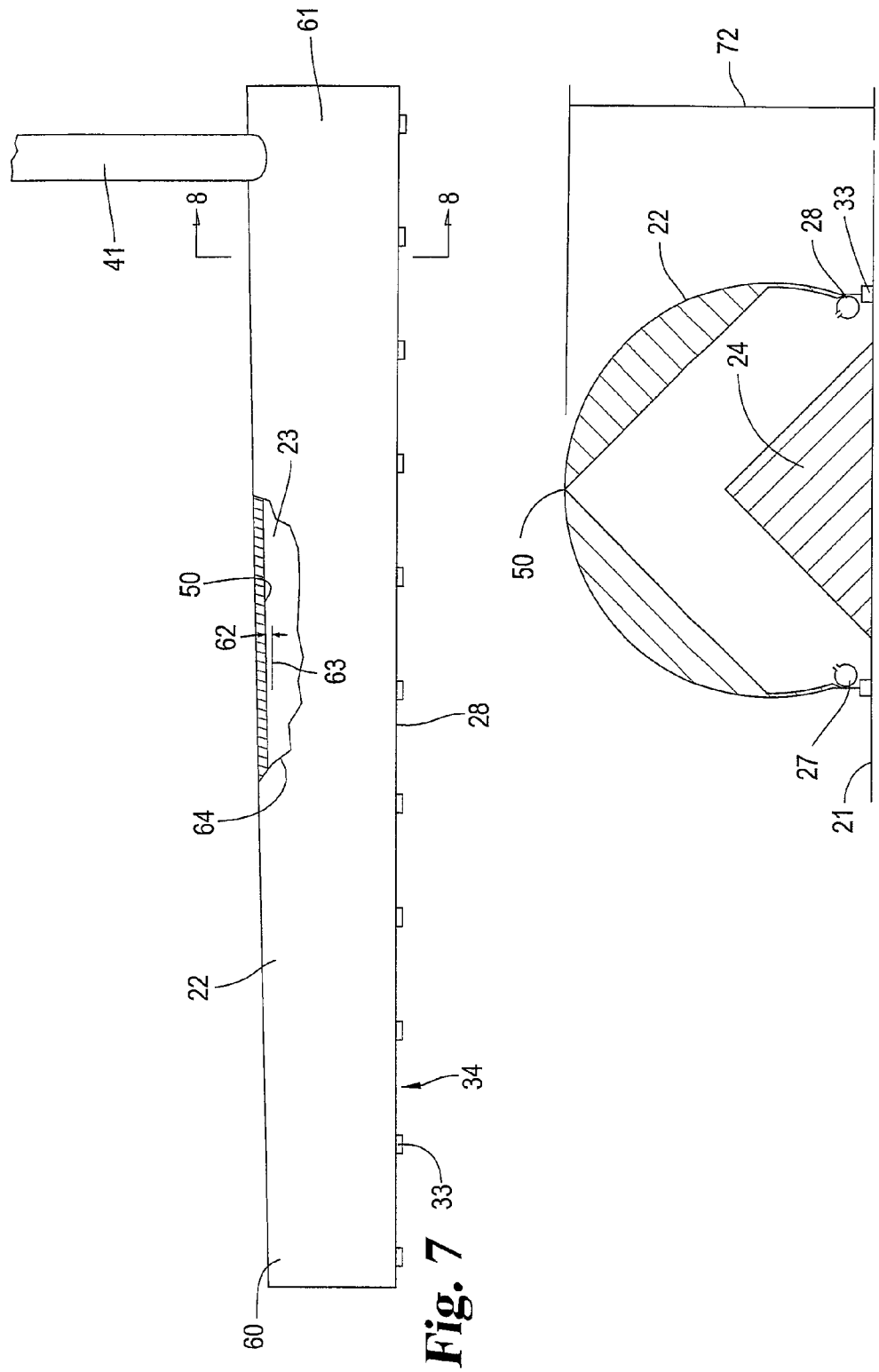

APPARATUS FOR REMOVING MATERIAL FROM A BODY OF LIQUID

BACKGROUND OF THE INVENTION

1. Field of the Invention

The present invention relates generally to the field of devices for removing foreign material from a body of liquid.

2. Description of the Prior Art

Many different types of reservoirs including tanks for holding a variety of liquids accumulate foreign material at the bottom of the reservoir or tank. Various types of devices have been provided in an attempt to remove the foreign material, typically through the use of air lift pumps requiring expenditure of large amounts of energy. The expense associated with the removal process adds significantly to the overall cross of maintaining the reservoir and tank. Particularly, in the field of raising shrimp or fish, the foreign material in the water can result in the development of a virus negatively impacting the shrimp. It is possible to place chemicals in the water in an attempt to control the virus; however, certain customers object to the use of chemicals detracting from such an approach. Other approaches include genetically engineering the shrimp to avoid the negative impact of the virus. The ultimate solution is to provide clean water for the raising of the shrimp or fish. I have therefore tried many approaches in providing the cleanest water possible to avoid the above problems.

One possible approach is to provide a cone shaped container in which the water is swirled to a bottom drain whereat the waste material is removed. Such an approach again takes considerable energy. Large outside reservoirs provide a very difficult hurdle in such an approach due to the quantity of the water. An object of this invention is therefore to provide clean water in the reservoir or tank in an efficient and low cost manner.

In the U.S. Pat. No. 4,181,614 assigned to The British Petroleum Company Limited, there is disclosed a horizontally extending pipe having a sloping inverted channel connected at its highest point to a riser pipe. Gas in introduced into the sloping inverted channel to direct the foreign material within the liquid to the riser pipe.

Another approach is disclosed in the U.S. Pat. Nos. 5,772,885 and 6,234,323 issued to Sarrouh which use a horizontally extending conduit moved horizontally on a track across the tank bottom. Both the '885 and '323 patents are directed to removing sludge from a wastewater treatment facility.

Another approach is disclosed in the U.S. Pat. No. 7,105,096 issued to Meurer which employs a horizontally extending pipe connected to a vacuum pump causing low pressure to be applied to the pipe for the removal of sludge from the floor of a basin.

The U.S. Pat. No. 4,600,338 issued to Van Bruwaene et al. discloses a device for removing high density foreign material from the bottom of a body of water by means of a horizontally extending intake duct connected to a riser pipe having an airlift pump thereon. U.S. Pat. No. 5,161,914 issued to Rahn et al. discloses a horizontal trench having a perforated casing attached to a vacuum pump by means of a vertical riser. U.S. Pat. No. 1,703,041 issued to Imhoff discloses a device for supplying compressed air at the bottom of a tank to drive oil particles within sewage to the top level of the tank whereat they are removed. U.S. Pat. No. 8,372,274 issued to Early et al. discloses a wastewater treatment system utilizing pumps and filters for decontaminating the wastewater.

In order to remove the foreign material including sludge from the body of liquid while using minimal energy, I have devised an inverted u-shaped conduit that extends along the bottom of the reservoir or tank that, in turn, is connected to a vertically extending outlet pipe. The conduit includes a restricted channel into which gas is directed to pull the foreign material through the inlets of the horizontally extending conduit and then through the channel to the upper most surface of the cavity of the horizontally extending conduit. The upper most surface slopes gently upward allowing the gas bubbles to move the foreign material and liquid toward the outlet pipe. The upward slope of the innermost surface of the conduit enables the gas bubbles and liquid flow to move under the force of the gas pressure towards the outlet pipe. The channel is formed by an insert located in the cavity having upwardly facing surfaces opposed to the downwardly facing surfaces of the conduit.

SUMMARY OF THE INVENTION

One embodiment of the present invention is an apparatus for removing sludge from a reservoir or tank of liquid. An elongated and downwardly opening enclosure having length with a first end a second end forms a cavity with opposite edge portions extending along the length of the enclosure. Spacers on the enclosure locate the opposite edge portions above the floor of the reservoir of liquid when inserted therein forming inlets between the edge portions and the floor for sludge and liquid in the reservoir to flow into the cavity. Gas emitters are located on and extend along the length of the opposite edge portions being operable to emit gas into the cavity of the enclosure thereby drawing liquid and sludge via the inlets into the cavity. An outlet leads from the cavity for the liquid and sludge to flow out of the enclosure. A liquid pump is connected to the outlet to move the liquid and sludge from the cavity.

It is an object of the present invention to provide a new and improved device for removing foreign material from a body of liquid in an efficient manner.

A further object of the present invention is to provide an apparatus for removing foreign material from a tank of water used for housing shrimp and fish.

A further object of the present invention is to provide a sludge removal system. Related object and advantages of the present invention will be apparent from the following description.

BRIEF DESCRIPTION OF THE DRAWINGS

FIG. 1 is a cutaway perspective view of the preferred embodiment of the apparatus to remove material from a body of liquid including a conduit extending horizontally across the bottom of the tank with a liquid displacement insert positioned therein and an exit pipe mounted at one end of the conduit.

FIG. 2 is an enlarged cross-sectional view of the conduit and liquid displacement insert taken along line 2-2 of FIG. 1 and viewed in the direction of the arrows.

FIG. 5 is the same view as FIG. 1 only showing a second alternate embodiment with the liquid displacement insert having a slot through which heavy sludge may flow.

FIG. 6 is an enlarged cross-sectional view of the conduit and liquid displacement insert taken along line 6-6 of FIG. 5 and viewed in the direction of the arrows.

FIG. 7 is a fragmented side view of enclosure 22 of FIG. 1 illustrating the positioning of the upper surface 50 of the cavity relative to the horizontal.

FIG. 8 is a cross-sectional view taken along the line 8-8 of FIG. 7 and viewed in the direction of the arrows.

DESCRIPTION OF THE PREFERRED EMBODIMENTS

Figures 3, 4:
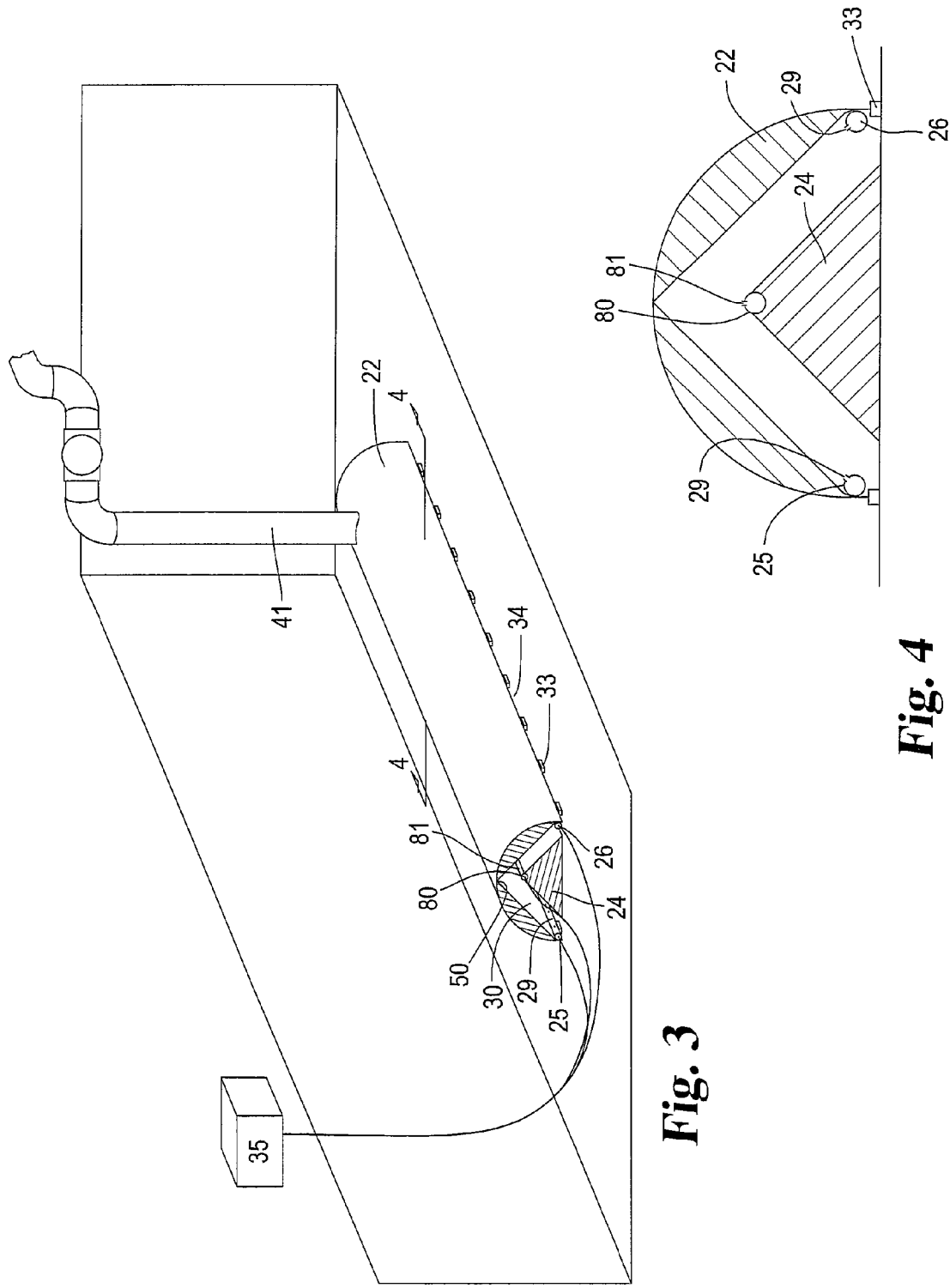
FIG. 3 is the same view as FIG. 1 only showing an alternate embodiment having an additional gas emitter mounted atop the liquid displacement insert.
FIG. 4 is an enlarged cross-sectional view of the conduit and liquid displacement insert taken along line 4-4 of FIG. 3 and viewed in the direction of the arrows.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown the tank or reservoir 20 for holding liquid. The liquid may include water with foreign material therein such as sludge or animal waste. Extending horizontally across the bottom wall or floor 21 of tank 20 is a conduit 22 having an internal cavity 23 in which is positioned a solid liquid displacement insert 24. Cavity 23 may take a variety of shapes, such as, an inverted u-shape or an inverted v-shape. Fixedly mounted to the bottom edge portions 27 and 28 (FIG. 2) of conduit 22 are respectively, gas emitting tubes 25 and 26 having outlets 29 pointed in the direction of the channel 30 formed between the upwardly facing surfaces 31 of insert 24 and the downwardly facing surfaces 32 of conduit 22.

The bottom edge portions 27 and 28 are spaced apart from floor 21 by spacers 33 fixedly mounted to the conduit 22. Spacers 33 are located and spaced apart along the length of the conduit thereby spacing the bottom edge of edge portions 27 and 28 apart from floor 21 and forming a plurality of inlets 34 (FIG. 1) through which the water and sludge may flow into the conduit. Tubes 25 and 26 are connected to a source 35 of pressurized gas such as air.

Conduit 22 includes an outlet 40 (FIG. 1) leading from cavity 23 into an exit pipe 41 mounted thereto. The pipe extends generally upwardly being attached to a conventional airlift pump 42 operable to lift the liquid and foreign material within pipe 41 and cavity 23 from outlet 40 and up through lift pipe 41 exiting the tank or reservoir via outlet pipe 43.

In the preferred embodiment shown in FIG. 2, the pair of channels 30 intersect atop the upper corner of the triangular shaped insert 24 forming an upper most surface 50 of cavity 23. Surface 50 extends upwardly from conduit end 60 to conduit end 61 at an approximate angle from one to ten degrees. Thus, the gas or air emitted by tubes 25 and 26 form bubbles which move along surface 50 in a direction from end 60 to end 61 due to the natural inclination of the bubbles to seek the top surface of the liquid within the tank. As the air bubbles extend along surface 50, they cause the liquid and foreign material to move in a direction from end 60 to 61 thereby exiting the conduit via outlet 40 flowing into pipe 41. The interior upper most surface 50 of cavity 23 is shown in the fragmented view in area 64 of FIG. 7 to illustrate the increasing elevation of surface 50 arranged at an angle 62 relative to the horizontal 63.

Ends 60 and 61 are closed in order to allow fluid flow into cavity 23 only through passages 34 with the fluid flow then exiting via outlet pipe 40. End 60 is shown open in the drawings to illustrate more clearly the internal channels. Surface 50 is spaced apart from floor 21 by distance 70 (FIG. 2) at end 60 with distance 70 increasing to distance 72 (FIG. 8) at the opposite end 61. In other words, surface 50 slopes upwardly relative to floor 21 as the surface extends from closed end 60 to closed end 61. The bottom edge portions 27 and 28 (FIG. 2) are parallel to the floor of the tank or the reservoir and parallel to the horizontal axis 63 (FIG. 7) with surface 50 being arranged at an acute angle 62 of approximately from one to ten degrees.

The apparatus shown in the drawings can be used for removing sludge from a reservoir of liquid including any type of foreign material that is mixed with water located in the reservoir. Housing 22 is elongated and has a downwardly opening cavity or enclosure extending between the opposite ends of the housing. The opposite edge portions 27 and 28 extend along the length of the enclosure and are supported by means including spacers 33 resting atop the floor of the reservoir forming inlets between the edge portions and the floor for the sludge and liquid in the reservoir to flow into cavity 23. The gas emitters 25 and 26 extend along the length of the opposite edge portions and are connected to a source 35 of pressurized gas to emit gas into the cavity of the enclosure thereby drawing liquid and sludge via the inlets 34 into the cavity. The outlets 29 of the gas emitters 25 and 26 are pointed upwardly into channels 30 formed between the downwardly facing surface 32 of the housing and the upwardly facing surface 31 of structure 24 located within the cavity. In other words, surfaces 31 and 32 cooperatively form the channel through which the liquid and sludge is directed upwardly from the inlets 34 to the upper most portion or surface 50 of the cavity formed by the intersection of the pair of channels 30 intersecting at the apex of the triangular shaped structure 24. An outlet 40 located at one end of the housing is connected to a lift pump 42 for withdrawing the liquid and sludge from the cavity. Surface 50 extends generally upward at from one to ten degree angle relative to the horizontal from end 60 to end 61 to allow the natural tendency of gas bubbles to rise thereby pulling the sludge in the liquid upwardly to the outlet with minimum external energy required to move the liquid and sludge.

Structure 29 is solid and relatively heavy so as to remain stationary on the floor of the reservoir. Structure 29 is a flow direction device positioned between the opposite edge portions 27 and 28 of the enclosure.

FIGS. 3 and 4 illustrate a first alternate embodiment whereas FIGS. 5 and 6 illustrate a second embodiment. Both alternate embodiments are identical to the preferred embodiment of FIGS. 1 and 2 with exception that the first alternate embodiment includes a booster air emitter 80 (FIGS. 3 and 4) located atop the triangular structure 29 whereas the second alternate embodiment in FIGS. 5 and 6 includes a slot 90 extending the length of structure 29 and also from the top portion of structure 29 to the base of structure 29 which rests atop the floor of the reservoir. Slot 90 empties into a heavy sludge holder 91 cavity located beneath structure 29 and housing 22. In the embodiments shown in all of the drawings, the upwardly facing surfaces 31 of structure 29 as well as surfaces 32 are planar.

In the first alternate embodiment of FIGS. 3 and 4, the apparatus is identical to the apparatus previously described and illustrated in FIGS. 1 and 2 with the exception that a booster gas emitter 80 is mounted to the top edge of the triangular shaped structure 29. Emitter 80 is a hollow tube extending the length of structure 29 and has a plurality of gas outlets 81 pointed upwardly toward the upper most portion 50 of cavity 23. Inlets 29 of the tubular gas emitters 25 and 26 are likewise oriented upwardly to pull the sludge and liquid through the inlets 34 and into the channel formed between surfaces 31 and 32 causing fluid flow towards the uppermost portion 50 of the cavity whereas emitter 80 adds additional gas in the form of bubbles to the cavity with the bubbles from outlets 81 flowing toward the upper most portion 50 providing additional pressure to force the liquid and sludge from end 60 of the enclosure to end 61 of the enclosure. Both inlets 81 and 29 are located along the length of enclosure 22 in the alternate embodiment of FIGS. 3 and 4.

In the second alternate embodiment illustrated in FIGS. 5 and 6, the apparatus is identical to the apparatus disclosed and illustrated in FIGS. 1 and 2 with the exception that a slot 90 extends entirely through structure 29 being vertically arranged to extend from the base of the triangular structure 29 to the top of the structure. Likewise, slot 90 extends along the entire length of structure 29 from end 60 to end 61 of enclosure 22. The heavy sludge holder 91 is a cavity located beneath structure 29 to allow sludge which is too heavy to be conveyed through outlet pipe 41 to simply fall into the slot where it drops into holder 91. Slot 90 forms a passage extending from the cavity 23 to the cavity formed by holder 91. Means are provided to empty heavy sludge holder 90

While the invention has been illustrated and described in detail in the drawings and foregoing description, the same is to be considered as illustrative and not restrictive in character, it being understood that only the preferred embodiments has been shown and described and that all changes and modifications that come within the spirit of the invention are desired to be protected.

What is claimed is:

1. An apparatus for removing sludge from a reservoir of liquid having a reservoir floor comprising:
   an elongated and downwardly opening enclosure having length with a first end and a second end and forming a cavity with an edge portion extending along the length of said enclosure, said enclosure having opposite edge portions, said enclosure further having a cavity downwardly facing surface, said flow direction device having an upwardly facing surface opposed to said cavity surface defining a channel through which liquid and sludge from said inlets flow;
   means on said enclosure and said edge portion forming inlets between said enclosure and said floor for sludge and liquid in said reservoir to flow into said cavity;
   gas emitters extending along the length of said edge portion operable to emit gas into said cavity of said enclosure drawing liquid and sludge via said inlets into said cavity;
   an outlet leading from said cavity for liquid and sludge to flow out of said enclosure; and,
   a liquid pump connected to said outlet to move said liquid and sludge from said cavity; and
   a flow direction device positioned within said cavity between said edge portions directing the liquid and sludge upwardly within said cavity; and,
   a booster gas emitter mounted to and extending atop and along the length of said flow direction device emitting gas to assist flow of liquid and sludge toward said second end and said outlet.

2. The apparatus of claim 1 wherein:
   said enclosure has a first end and an opposite second end, said cavity slopes upward from said first end of said enclosure to said opposite second end of said enclosure whereat said outlet is located, said liquid pump is connected to said outlet which is a conduit leading from said cavity to external of said reservoir of liquid.

3. The apparatus of claim 1 wherein:
   said cavity downwardly facing surface and said upwardly facing surface of said flow direction device are planar surfaces, said cavity has an uppermost portion extending upwardly in a direction from said first end to said second end of said enclosure.

4. The apparatus of claim 3 wherein:
   said uppermost portion of said cavity extends upwardly relative to horizontal at approximately from one to ten degrees.

5. The apparatus of claim 1 and further comprising:
   a heavy sludge holder located beneath said enclosure with said flow direction device including a passage leading from said cavity to said holder to allow flow of heavy sludge from said cavity to said holder.

6. The apparatus of claim wherein:
   said passage extends though and lengthwise along said flow direction device.

7. The apparatus of claim 1 wherein:
   said gas emitters have gas outlets located in a direction of said channel to assist flow of said liquid and sludge therethrough while increasing flow of said liquid and sludge through said inlets.

8. An apparatus for removing sludge from a reservoir of liquid having a reservoir floor comprising:
   an elongated and downwardly opening enclosure having length and forming a cavity with an edge portion extending along the length of said enclosure;
   spacers on said edge portion positionable above a floor of a reservoir of liquid when inserted therein forming inlets between said edge portion, spacers and said floor for sludge and liquid in said reservoir to flow into said cavity;
   a gas conduit adjacent said edge portion to emit gas into said cavity of said enclosure drawing liquid and sludge via said inlets into said cavity;
   a structure positionable atop said floor within said enclosure to define a channel between said structure and said enclosure for said liquid and sludge to flow from said inlets;
   an outlet leading from said cavity for said liquid and sludge to flow out of said cavity;
   a liquid pump connected to said outlet to move said liquid and sludge from said cavity; and,
   a gas booster outlet on said structure assisting flow of said liquid and sludge in said channel toward said outlet, said structure has a triangular configuration with said gas booster located thereatop.

9. The apparatus of claim 8 wherein:
   said gas conduit has gas outlets and are located with said inlets along the length of said enclosure.

10. The combination of:
    a reservoir with a reservoir floor and having foreign material therein mixed with water within said reservoir;
    an elongated housing with a first end and a second end positioned atop said floor and having a downwardly facing surface cooperatively with said floor defining a cavity, said housing having lengthwise extending opposite side portions restable atop said floor with inlets provided for foreign material and water from said reservoir to flow into said cavity;

a structure with length located within said cavity cooperatively with said cavity defining a channel through which said foreign material and water flow;

gas outlets located along said side portions of said elongated housing directing gas into said channel carrying foreign material and water through said inlets into said channel; a booster gas emitter mounted atop said structure and extending along said length emitting gas to assist flow of foreign material and water towards said second end; and, an outlet in communication with said channel to direct said foreign material and water to flow outwardly from said housing and said reservoir.

11. The combination of claim 10 wherein:

said cavity has a cavity downwardly facing surface that slopes upwardly from said first end to said second end allowing gas from said gas outlets to flow upwardly with said foreign material and water to said outlet.

12. A system for removing foreign material from a reservoir of water comprising:

a container having walls and a bottom forming a reservoir for containing water, said container including an elongated enclosure located at said bottom having length with a first end and a second end and an upper portion with an inner upper surface extending upwardly from said first end toward said second end and forming a cavity, said container including inlets allowing water and foreign material to flow into said enclosure via said inlets and further including an outlet for water and foreign material to flow out of said enclosure;

a flow direction device with a top portion with said device positioned in said cavity directing water and foreign material toward said upper surface;

a booster gas emitter extending in a direction from said first end toward said second end and located at said top portion of said flow direction device to emit gas assisting flow of water and foreign material toward said second end;

a main gas emitter to emit gas into said enclosure forcing water and foreign material within said enclosure to move toward said upper surface and toward said second end;

an outlet leading from said enclosure and extending upwardly to allow water within said enclosure to flow upwardly with foreign material; and, a source of pressurized gas in communication with said booster gas emitter and said main gas emitter to move water and foreign material from said enclosure and toward said second end and outlet.

13. A device for removing sludge from a body of liquid atop a floor comprising:

an elongated and downwardly opening enclosure positionable atop a floor of a body of liquid and having length with a first end and a second end forming a cavity with an edge portion extending along the length of said enclosure with inlets provided for sludge and liquid to flow into said cavity;

a source of gas;

gas emitters connected to said source of gas and located in a direction of said length of said enclosure operable to emit gas into said cavity drawing sludge and liquid via said inlets into said cavity;

a flow direction device positioned within said cavity atop the floor and extending in said direction, said device cooperatively forming with said enclosure a channel directing sludge and liquid from said inlets upwardly within said cavity; and, an outlet leading from said cavity for sludge and liquid to flow out of said cavity; and, wherein:

said flow direction device has a top portion and a booster gas emitter at said top portion emitting gas to assist flow of sludge and liquid directed by said gas emitters into said inlets through said channel toward said outlet.

* * * * *